United States Patent Office 3,610,101
Patented Oct. 5, 1971

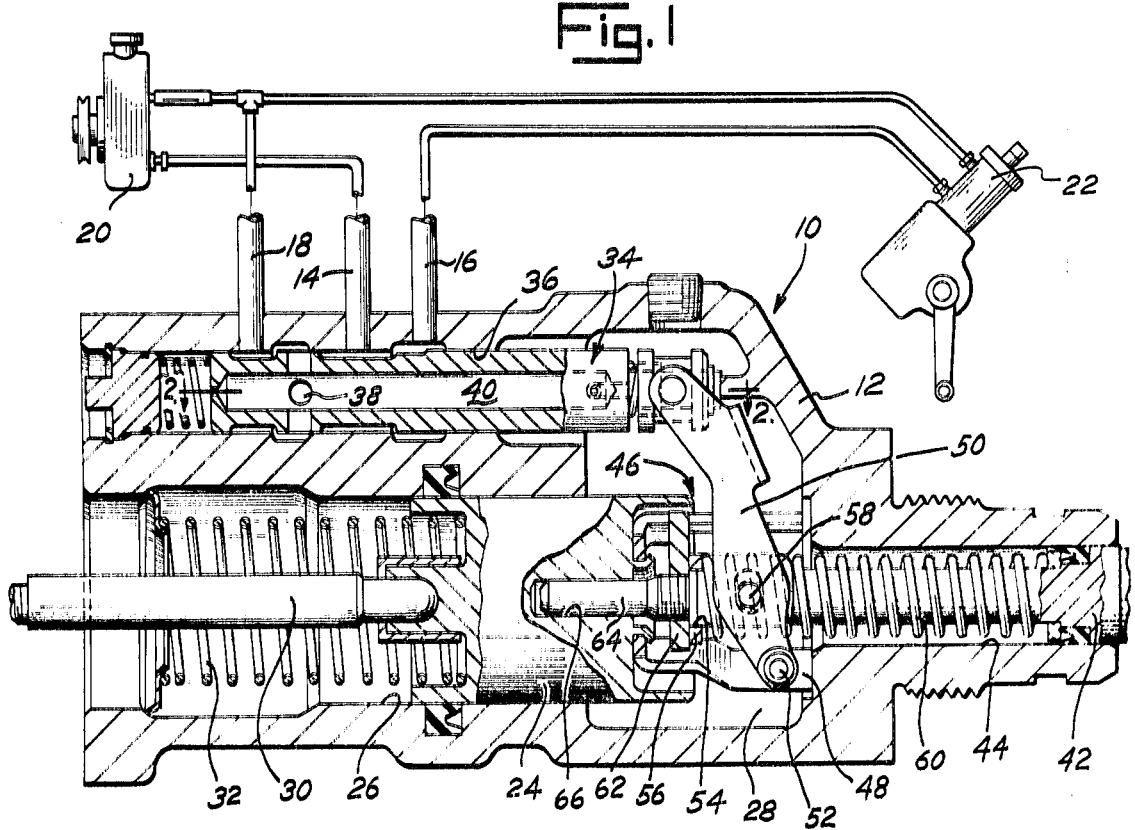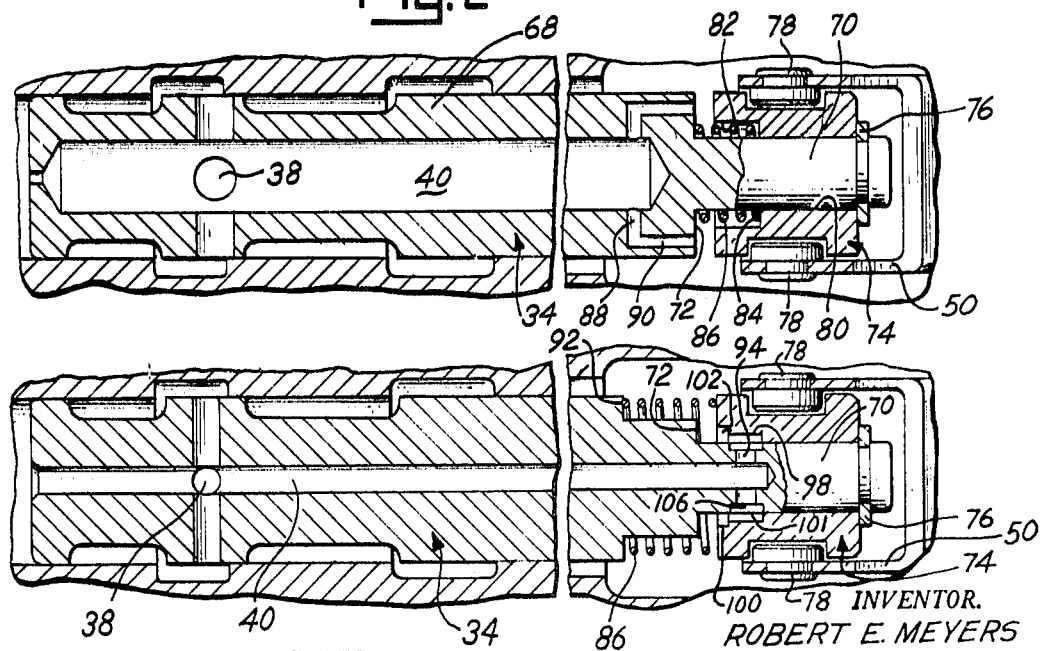

3,610,101
SAFETY DEVICE FOR HYDRAULIC BRAKE BOOSTER
Robert E. Meyers, South Bend, Ind., assignor to
The Bendix Corporation
Filed Mar. 9, 1970, Ser. No. 17,486
Int. Cl. F15b *11/08, 13/04, 13/10*
U.S. Cl. 91—391 R                    10 Claims

ABSTRACT OF THE DISCLOSURE

A hydraulic boost device is disclosed which includes a housing having a fluid inlet, an outlet, a bore communicating the inlet with the outlet, and a chamber in fluid communication with the bore. A spool valve is slidable in the bore from a position in which substantially all of the fluid flow into the inlet is directed to the outlet to a position in which a portion of the fluid flowing into the inlet is communicated to the chamber through a fluid passage in the valve means. The fluid in the chamber slides a piston to assist the vehicle operator in applying the brakes. A control rod which is actuated by the vehicle operator when the vehicle's brakes are applied is connected to a sleeve that is slidably mounted on the spool valve. A spring normally prevents relative movement between the sleeve and the spool valve, but permits the sleeve to move relative to the valve to close the passages if a malfunction prevents the spool valve from moving. This feature prevents a sudden surge of fluid from being communicated to the chamber during a manual brake application.

BACKGROUND OF THE INVENTION

This invention relates to a hydraulic boost device for use in the brake system of an automotive vehicle.

Because of their smaller size and lower weight, hydraulic brake boosters are expected to be used in lieu of vacuum boosters in vehicles having power assisted brakes in the near future. Such a device is disclosed in U.S. Pat. application Ser. No. 793,923, filed Jan. 16, 1969, owned by the assignee of the present invention and incorporated herein by reference. This unit utilizes the pressurized fluid produced by the vehicle's power steering pump to provide a hydraulic assist to the vehicle operator when the brakes are applied. The device disclosed in the aforementioned application permits manual actuation of the brakes should the supply of pressurized fluid to the unit be terminated or should a malfunction in the valve mechanism fail to communicate fluid into the unit. When the valve mechanism malfunctions, the valve sometimes resumes normal operation after the brakes have been partially applied manually. When this occurs, the vehicle stops abruptly, often damaging the vehicle and injuring its passengers.

SUMMARY OF THE INVENTION

Therefore, an important object of my invention is to prevent a sudden admission of hydraulic fluid into a brake booster after an initial valve malfunction has initiated a manual brake application.

Another important object of my invention is to permit hydraulic fluid to gradually assist the vehicle operator after an initial valve malfunction is terminated.

DESCRIPTION OF THE DRAWINGS

FIG. 1 is a schematic view of a vehicle hydraulic system with a brake booster made pursuant to my present invention illustrated in cross-section;

FIG. 2 is a cross-sectional view taken along line 2—2 of FIG. 1; and

FIG. 3 is a cross-sectional view similar to FIG. 2 but illustrating another embodiment of my invention.

DETAILED DESCRIPTION

Referring now to the drawings, a brake booster 10 includes a housing 12 having an inlet port 14, an outlet port 16, and a return or exhaust port 18. The inlet port 14 is communicated with the high pressure side of a power steering pump 20, and the outlet port 16 is communicated with the inlet port of a power steering gear 22. The exhaust port 18 is communicated to the low pressure side of the pump 20 as is the outlet port of the power steering gear 22.

A boost piston 24 is slidable in a longitudinal bore 26 within the housing 12. One end of the piston 24 is slidably received in a boost chamber 28 within the housing. A rod 30 connects the other end of the piston 24 with a standard master cylinder (not shown) mounted on the left side of the housing 12 viewing FIG. 1. Movement of the piston 24 to the left develops pressure in the master cylinder in the usual manner to apply the vehicle's brakes. A return spring 32 also engages the other end of the piston 24 to return the latter to its normal position upon release of the brakes.

A spool valve 34 is slidable in a bore 36 within the housing 12 and is adapted to control fluid communication between the inlet 14, outlet 16 and the boost chamber 28. In the position illustrated in FIG. 1, the spool valve 34 communicates substantially all of the fluid that flows into the inlet directly to the outlet and vents the chamber 28 to the low pressure side of the pump 20 through exhaust port 18. However, if the spool valve 34 is shifted to the left viewing the figures, fluid communication between the chamber 28 and exhaust port 18 is terminated and a portion of the fluid flowing into the inlet 14 is communicated to the boost chamber 28 through the radially extending passages 38 and longitudinally extending passage 40 in the spool valve 34. Details of the construction and operation of the spool valve 34 are disclosed in copending U.S. Pat. application 13,415, filed Feb. 24, 1970, owned by the assignee of the present invention and incorporated herein by reference.

An operator-operated control rod 42 is slidably mounted in yet another bore 44 within the housing 12. One end of the control rod 42 is secured to the usual brake pedal (not shown) in the vehicle operator's compartment, and the other end of the control rod 42 is operably connected to the spool valve 34 and to the piston 24 by connecting mechanism generally indicated at 46.

Connecting mechanism 46 includes a bracket 48 mounted on the end of the piston 24 and a pair of levers 50, one end of which are connected to the bracket 48 by pivots 52. The control rod 42 extends through an aperture 54 in a plate 56 pivotally mounted on the levers 50 as at 58. A spring 60 yieldably biases an abutment 62 secured to the rod 42 into engagement with the plate 56. The end portion 64 of the rod 42 is slidably supported in a blind bore 66 formed in the piston 24. Details of the construction of the connecting mechanism 46 are described in detail in copending U.S. application Ser. No. 14,133, filed Feb. 25, 1970, owned by the assignee of the present invention, and incorporated herein by reference.

Spool valve 34 is stepped to present a larger diameter portion 68 which houses the passages 38 and 40 and a smaller diameter end portion 70 with a shoulder 72 therebetween. A sleeve 74 is slidably mounted on the smaller portion 70 for movement between the shoulder 72 and an abutment 76 on the outer end of the smaller. portion 70. A pair of pivots 78 interconnect the levers 50 and the sleeve 74. The inner diameter of the sleeve 74 is stepped to present a smaller diameter portion 80 engaging the portion 70 of the valve 34, a larger diameter portion 82, and a laterally extending surface 84 therebetween. A spring 86 is disposed between the shoulder 72 and the surface 84 to yieldably urge the sleeve 74 toward the abutment 76. The longitudinal passage 40 terminates in a plurality of radially extending passages 88 which communicate fluid from the longitudinal passage 40 to a plurality of passages 90, each of which terminate in openings in the shoulder 72.

MODE OF OPERATION

When the vehicle operator depresses the brake pedal, the control rod 42 is urged to the left viewing FIG. 1. Assuming normal operation of the valve, the spring 60 maintains the abutment 62 in engagement with the plate 56, thereby permitting movement of the rod 52 to slide the spool valve 34 to the left viewing the figure thereby closing communication between port 18 and the chamber admitting fluid into the boost chamber 28. Fluid in the chamber 28 acts on the end of the piston 24 thereby urging the latter to the left viewing FIG. 1 to assist the vehicle operator in applying the brakes. Spring 86 maintains the sleeve 74 in engagement with the abutment 76, thereby permitting fluid to flow freely from the passages 90 into the chamber 28. When the operator releases the brake pedal, the spring 32 returns the mechanisms to their normal position.

If a malfunction should prevent the spool valve from moving when the operator depresses the brake pedal, movement of the control rod 42 will slide the sleeve 74 on the spool valve 34 against the bias of the spring 86 until the sleeve 74 contacts the shoulder 72 to close the passages 90, thereby preventing fluid from flowing through the latter should the valve 34 later move. At the same time, spring 60 yields, permitting the rod 42 to move relative to the levers 50 until the end of the rod engages the end of the blind bore 66 to provide a direct link between the brake pedal and the piston 24 thereby permitting manual actuation of the brakes. The force of the spring 60 will be transmitted to the sleeve 74 through the plate 56 and levers 50 during a manual actuation of the brake so that the sleeve 74 is maintained in engagement with the shoulder 72 until the brake pedal is released, thereby preventing a sudden admission of fluid into the chamber 28 should be spool valve suddently move during a manual brake application.

DESCRIPTION OF THE MODIFIED EMBODIMENT

In the embodiment of FIG. 3, elements substantially the same as those in the preferred embodiment retain the same reference manual. In FIG. 3, another shoulder 92 is formed on the larger portion 68 of the spool valve, and the spring 86 is disposed between the shoulder 92 and the sleeve 74. A plurality of radially extending passages 94 normally communicate the longitudinal passage 40 with the chamber 28. The inside diameter of the sleeve 74 is stepped to present the smaller diameter portion 80 that slidably engages the end portion 70 of the valve 34, and a larger diameter portion 98 with laterally extending grooves 100 and 102 therebetween. When the sleeve engages the shoulder 72 during a valve malfunction, passages 94 are communicated with an annulus 106 defined by the end portion 70, the shoulder 72, large diameter portion 98 and the grooves 100 and 102. Should the valve 34 move during a manual brake application, fluid will be communicated to the annulus 106. Fluid in the annulus 106 is communicated through the grooves 100 and 102 to the shoulder 72. Fluid acting against the shoulder 72 creates a force urging the sleeve 74 toward the abutment 76 a very small amount, permitting metered flow of fluid from the annulus 106 into the chamber 28. Since fluid flows gradually into the chamber 28, damage to the vehicle and its occupants due to a sudden power application of the vehicle brakes is prevented.

I claim:
1. In a hydraulic boost device:
a housing having a fluid inlet, an outlet, a bore communicating the inlet with the outlet, and a chamber in fluid communication with said inlet;
valve means shiftable in said bore for controlling fluid communication between the inlet, the outlet, and the chamber;
passage means within said valve means;
piston means shiftable in said chamber;
actuating means operably connected to said valve means for shifting the latter from a first position in which said valve means communicates fluid from the inlet to the outlet to a second position in which said valve means communicates at least a portion of the fluid into the inlet to said chamber through the passage means to shift said piston; and
means slidable on said valve means to close said passage means when a malfunction prevents said valve means from moving upon actuation of the actuating means.
2. The invention of claim 1:
said actuating means including an operator-operated control rod and lever means for transmitting movement of the control rod to the valve means;
said lever means being operably connected to said slidable means.
3. The invention of claim 2:
said slidable means being a sleeve slidable on said valve means from a first position permitting fluid to flow from said passage means into said chamber to a second position closing said passage means; and
resilient means yieldably biasing said valve means toward said first position;
said lever means being pivotally secured to said sleeve.
4. The invention of claim 3:
said valve means being stepped to present larger and smaller diameter portions with a shoulder therebetween;
said sleeve being slidable on said smaller diameter portion; and
abutment means on the end of said smaller diameter portion;
said abutment means defining said first position;
said second position being defined by the engagement of said sleeve with said shoulder.
5. The invention of claim 4:
said passage means terminating in an opening in said shoulder;
said sleeve closing said opening when the sleeve is in said second position.
6. The invention of claim 4:
the inner surface of said sleeve being stepped to present larger and smaller diameter sections with a laterally extending surface therebetween;
said smaller diameter section being slidably engaged with the smaller diameter portion of the valve means;
said resilient means being disposed between said laterally extending surface and the shoulder on the valve means.
7. The invention of claim 6:
the larger diameter section of the sleeve, the smaller diameter portion of the valve means, said shoulder, and said laterally extending surface defining a fluid chamber when said malfunction prevents said valve means from moving;
said passage means communicating fluid into said chamber upon movement of the valve means after an initial malfunction.
8. In a hydraulic boost device:
a housing having a fluid inlet, an outlet, a bore communicating the inlet with the outlet, and a chamber in fluid communication with said inlet;
a piston slidable in said chamber;
valve means slidable in said bore from a first position in which substantially all of the fluid flowing through the inlet is directed to the outlet to a second position in which a portion of the fluid is directed into the boost chamber for shifting the piston;

passage means within said valve means for communicating fluid to the boost chamber when the valve means is in the second position;

a sleeve slidable on said valve means;

operator-actuated means engaging said sleeve; and resilient means normally preventing relative movement between the sleeve and the valve means to permit the operator-actuated means to shift the valve means;

said resilient means permitting said sleeve to slide on said valve means to close said passage means when a malfunction prevents said valve means from moving upon actuation of the operator-actuated means.

9. The invention of claim 8:

said valve means having larger and smaller diameter portions presenting a shoulder therebetween;

said sleeve being slidably mounted on said smaller diameter portion and having a vertically extending face adopted to engage said shoulder to terminate fluid communication between the passage means and said chamber.

10. The invention of claim 8:

said valve means having larger and smaller diameter portions presenting a shoulder therebetween;

said sleeve having a vertically extending face;

said resilient means being a spring disposed between said shoulder and said face.

References Cited
UNITED STATES PATENTS

| 3,054,386 | 8/1962 | Bohnhoff | 60—54.6 P |
| 3,173,339 | 3/1965 | Larsen | 91—391 |

References Cited
UNITED STATES PATENTS

| 1,105,351 | 1968 | Great Britain | 91—391 |

PAUL E. MASLOUSKY, Primary Examiner

U.S. Cl. X.R.

91—469; 60—54.6 P